United States Patent
Fike et al.

(10) Patent No.: US 7,388,843 B2
(45) Date of Patent: Jun. 17, 2008

(54) METHOD AND APPARATUS FOR TESTING LOOP PATHWAY INTEGRITY IN A FIBRE CHANNEL ARBITRATED LOOP

(75) Inventors: John M Fike, Austin, TX (US); William J. Wen, Austin, TX (US); Patricia E Hareski, Austin, TX (US); Sudhakar V. Allada, Austin, TX (US)

(73) Assignee: QLogic, Corporation, Aliso Viejo, CA (US)

( * ) Notice: Subject to any disclaimer, the term of this patent is extended or adjusted under 35 U.S.C. 154(b) by 752 days.

(21) Appl. No.: 10/889,551

(22) Filed: Jul. 12, 2004

(65) Prior Publication Data

US 2005/0025060 A1 Feb. 3, 2005

Related U.S. Application Data

(60) Provisional application No. 60/487,876, filed on Jul. 16, 2003, provisional application No. 60/487,887, filed on Jul. 16, 2003, provisional application No. 60/487,875, filed on Jul. 16, 2003, provisional application No. 60/490,747, filed on Jul. 29, 2003, provisional application No. 60/487,667, filed on Jul. 16, 2003, provisional application No. 60/487,665, filed on Jul. 16, 2003, provisional application No. 60/492,346, filed on Aug. 4, 2003, provisional application No. 60/487,873, filed on Jul. 16, 2003.

(51) Int. Cl.
*H04L 12/26* (2006.01)
*H04L 1/00* (2006.01)
*H04L 1/16* (2006.01)
*H04J 1/16* (2006.01)
*H04J 3/14* (2006.01)
*G01R 31/08* (2006.01)
*G06F 11/00* (2006.01)
*G08C 15/00* (2006.01)

(52) U.S. Cl. .............. 370/241; 370/241.1; 370/244; 370/248; 370/249; 370/250; 370/251
(58) Field of Classification Search .......... 370/248, 370/241, 241.1, 244, 249, 250, 251
See application file for complete search history.

(56) References Cited

U.S. PATENT DOCUMENTS 4,162,375 A 7/1979 Schilichte ............ 179/15

(Continued)

FOREIGN PATENT DOCUMENTS

EP 0649098 9/1994

(Continued)

OTHER PUBLICATIONS

Fibre Channel: Standards, Applications, and Products—Kessler G., Goralski W., Dec. 1995. Online publication. http://www.garykessler.net/library/fibre_channel.html retrieved: Aug. 22, 2007.*

(Continued)

*Primary Examiner*—Chi Pham
*Assistant Examiner*—Xavier Wong
(74) *Attorney, Agent, or Firm*—Klein, O'Neill & Singh, LLP

(57) ABSTRACT

A method for performing a fibre channel arbitrated loop integrity test using a fibre channel switch element is provided. The method includes, sending a fibre channel frame through the arbitrated loop; receiving the fibre channel frame after it has traversed through the arbitrated loop; performing a data compare between the fibre channel frame that was sent and the fibre channel frame that is received; detecting internal errors, if any, in the traversed fibre channel loop; and isolating a module that may have generated the error. The switch element includes, a cascade port that is used to couple one fibre channel switch element to another in a loop; and a port that sends a fibre channel frame through the loop and detects internal errors based on the comparison and a isolates a module that may have generated the internal error.

16 Claims, 12 Drawing Sheets

U.S. PATENT DOCUMENTS

| | | | |
|---|---|---|---|
| 4,200,929 A | 4/1980 | Davidjuk et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 340/825 |
| 4,980,857 A | 12/1990 | Walter et al. | |
| 5,051,742 A | 9/1991 | Hullett et al. | |
| 5,115,430 A | 5/1992 | Hahne et al. | |
| 5,144,622 A | 9/1992 | Takiyasu et al. | 370/85.13 |
| 5,260,933 A | 11/1993 | Rouse | |
| 5,367,520 A | 11/1994 | Cordell | 370/60 |
| 5,568,614 A | 10/1996 | Mendelson et al. | |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,748,612 A | 5/1998 | Stoevhase et al. | 370/230 |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,825,748 A | 10/1998 | Barkey et al. | |
| 5,828,475 A | 10/1998 | Bennett et al. | |
| 5,835,752 A | 11/1998 | Chiang et al. | |
| 5,850,386 A | 12/1998 | Anderson et al. | |
| 5,894,560 A | 4/1999 | Carmichael et al. | |
| 5,954,796 A | 9/1999 | McCarty et al. | |
| 5,978,359 A | 11/1999 | Caldara et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A | 2/2000 | Trevitt et al. | |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A | 9/2000 | Berman | |
| 6,128,292 A | 10/2000 | Kim et al. | 370/356 |
| 6,144,668 A | 11/2000 | Bass et al. | |
| 6,160,813 A | 12/2000 | Banks et al. | 370/422 |
| 6,201,787 B1 | 3/2001 | Baldwin et al. | |
| 6,229,822 B1 | 5/2001 | Chow et al. | |
| 6,240,096 B1 | 5/2001 | Book | |
| 6,253,267 B1 | 6/2001 | Kim et al. | |
| 6,289,002 B1 | 9/2001 | Henson et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,343,324 B1 | 1/2002 | Hubis et al. | |
| 6,353,612 B1 | 3/2002 | Zhu et al. | |
| 6,370,605 B1 | 4/2002 | Chong | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,449,274 B1 | 9/2002 | Holden et al. | 370/392 |
| 6,452,915 B1 | 9/2002 | Jorgensen | |
| 6,457,090 B1 | 9/2002 | Young | |
| 6,467,008 B1 | 10/2002 | Gentry, Jr. et al. | 710/261 |
| 6,470,026 B1 | 10/2002 | Pearson et al. | |
| 6,532,212 B1 | 3/2003 | Soloway et al. | |
| 6,570,850 B1 | 5/2003 | Gutierrez et al. | |
| 6,570,853 B1 | 5/2003 | Johnson et al. | |
| 6,594,231 B1 * | 7/2003 | Byham et al. | 370/223 |
| 6,597,691 B1 | 7/2003 | Anderson et al. | 370/360 |
| 6,597,777 B1 | 7/2003 | Ho | |
| 6,614,796 B1 | 9/2003 | Black et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,744,772 B1 | 6/2004 | Eneboe et al. | |
| 6,760,302 B1 | 7/2004 | Ellinas et al. | |
| 6,785,241 B1 | 8/2004 | Lu et al. | |
| 6,807,181 B1 | 10/2004 | Weschler | |
| 6,816,750 B1 | 11/2004 | Klaas | |
| 6,859,435 B1 | 2/2005 | Lee et al. | |
| 6,865,157 B1 | 3/2005 | Scott et al. | |
| 6,886,141 B1 | 4/2005 | Kunz et al. | |
| 6,941,357 B2 | 9/2005 | Nguyen et al. | |
| 6,941,482 B2 | 9/2005 | Strong | |
| 6,952,659 B2 | 10/2005 | King et al. | |
| 6,968,463 B2 | 11/2005 | Pherson et al. | |
| 7,000,025 B1 | 2/2006 | Wilson | |
| 7,002,926 B1 | 2/2006 | Eneboe et al. | |
| 7,010,607 B1 | 3/2006 | Bunton | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,055,068 B2 | 5/2006 | Riedl | |
| 7,061,871 B2 | 6/2006 | Sheldon et al. | |
| 7,092,374 B1 | 8/2006 | Gubbi | |
| 7,110,394 B1 * | 9/2006 | Chamdani et al. | 370/355 |
| 7,124,169 B2 | 10/2006 | Shimozono et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,188,364 B2 | 3/2007 | Volpano | |
| 7,190,667 B2 | 3/2007 | Susnow et al. | |
| 7,194,538 B1 | 3/2007 | Rabe et al. | |
| 7,200,108 B2 | 4/2007 | Beer et al. | |
| 7,215,680 B2 | 5/2007 | Mullendore et al. | |
| 7,221,650 B1 | 5/2007 | Cooper et al. | |
| 7,245,613 B1 | 7/2007 | Winkles et al. | |
| 7,248,580 B2 | 7/2007 | George et al. | |
| 7,269,131 B2 | 9/2007 | Cashman et al. | |
| 7,292,593 B1 | 11/2007 | Winkles et al. | |
| 2001/0011357 A1 * | 8/2001 | Mori | 714/25 |
| 2001/0038628 A1 | 11/2001 | Ofek et al. | |
| 2001/0047460 A1 | 11/2001 | Kobayashi et al. | |
| 2002/0034178 A1 | 3/2002 | Schmidt et al. | |
| 2002/0071387 A1 | 6/2002 | Horiguchi et al. | |
| 2002/0103913 A1 | 8/2002 | Tawil et al. | |
| 2002/0104039 A1 | 8/2002 | DeRolf et al. | |
| 2002/0124124 A1 | 9/2002 | Matsumoto et al. | |
| 2002/0147560 A1 | 10/2002 | Devins et al. | |
| 2002/0147843 A1 | 10/2002 | Rao | |
| 2002/0156918 A1 | 10/2002 | Valdevit et al. | |
| 2002/0172195 A1 | 11/2002 | Pekkala et al. | |
| 2002/0191602 A1 | 12/2002 | Woodring et al. | |
| 2002/0196773 A1 | 12/2002 | Berman | |
| 2003/0002503 A1 | 1/2003 | Brewer et al. | |
| 2003/0016683 A1 | 1/2003 | George et al. | |
| 2003/0021239 A1 | 1/2003 | Mellendore et al. | |
| 2003/0026267 A1 | 2/2003 | Oberman et al. | |
| 2003/0026287 A1 | 2/2003 | Mullendore et al. | |
| 2003/0035433 A1 | 2/2003 | Craddock et al. | |
| 2003/0046396 A1 | 3/2003 | Richter et al. | |
| 2003/0056000 A1 | 3/2003 | Mullendore et al. | |
| 2003/0072316 A1 | 4/2003 | Niu et al. | |
| 2003/0079019 A1 | 4/2003 | Lolayekar et al. | |
| 2003/0084219 A1 | 5/2003 | Yao et al. | |
| 2003/0086377 A1 | 5/2003 | Berman | |

| | | | |
|---|---|---|---|
| 2003/0091062 | A1 | 5/2003 | Lay et al. |
| 2003/0103451 | A1 | 6/2003 | Lutgen et al. |
| 2003/0117961 | A1* | 6/2003 | Chuah et al. ............... 370/242 |
| 2003/0120983 | A1 | 6/2003 | Vieregge et al. |
| 2003/0126223 | A1 | 7/2003 | Jenne et al. |
| 2003/0137941 | A1 | 7/2003 | Kaushik et al. |
| 2003/0174789 | A1 | 9/2003 | Waschura et al. |
| 2003/0179709 | A1 | 9/2003 | Huff |
| 2003/0179748 | A1 | 9/2003 | George et al. ............... 370/389 |
| 2003/0189930 | A1 | 10/2003 | Terrell et al. |
| 2003/0189935 | A1 | 10/2003 | Warden et al. |
| 2003/0195983 | A1 | 10/2003 | Krause |
| 2003/0229808 | A1 | 12/2003 | Heintz et al. |
| 2003/0236953 | A1 | 12/2003 | Grieff et al. |
| 2004/0013092 | A1 | 1/2004 | Betker et al. |
| 2004/0013125 | A1 | 1/2004 | Betker et al. |
| 2004/0015638 | A1 | 1/2004 | Bryn |
| 2004/0024831 | A1 | 2/2004 | Yang et al. |
| 2004/0028038 | A1 | 2/2004 | Anderson et al. |
| 2004/0057389 | A1 | 3/2004 | Klotz et al. |
| 2004/0081186 | A1 | 4/2004 | Warren et al. |
| 2004/0081394 | A1 | 4/2004 | Biren et al. |
| 2004/0085955 | A1 | 5/2004 | Walter et al. |
| 2004/0100944 | A1 | 5/2004 | Richmond et al. |
| 2004/0109418 | A1* | 6/2004 | Fedorkow et al. ........... 370/251 |
| 2004/0123181 | A1 | 6/2004 | Moon et al. |
| 2004/0141521 | A1 | 7/2004 | George ....................... 370/463 |
| 2004/0153914 | A1 | 8/2004 | El-Batal |
| 2004/0174813 | A1 | 9/2004 | Kasper et al. |
| 2004/0208201 | A1 | 10/2004 | Otake |
| 2004/0267982 | A1 | 12/2004 | Jackson et al. |
| 2005/0023656 | A1 | 2/2005 | Leedy |
| 2005/0036499 | A1 | 2/2005 | Dutt et al. |
| 2005/0117522 | A1 | 6/2005 | Basavaiah et al. |
| 2005/0177641 | A1 | 8/2005 | Yamagami |
| 2006/0013248 | A1 | 1/2006 | Mujeeb et al. |
| 2006/0047852 | A1 | 3/2006 | Shah et al. |
| 2006/0074927 | A1 | 4/2006 | Sullivan et al. |
| 2006/0184711 | A1 | 8/2006 | Pettey |

FOREIGN PATENT DOCUMENTS

| | | |
|---|---|---|
| EP | 0856969 | 1/1998 |
| WO | WO-98/36537 | 8/1998 |
| WO | WO03/088050 | 10/2003 |

OTHER PUBLICATIONS

Banks, David C., et al., "Link Trunking and Measuring Link Latency in Fibre Channel Fabric", U.S. Appl. No. 60/286,046, 1-52.

"Deliver Server-Free Backup", *Pathlight & Computer Associates*, White Paper of Apr. 2000, Ithaca, New York, XP-002381153, 1-8.

Naik, D., "Inside Windows Storage:Server Storage Technologies for Windows 2000, Windows Server 2003 and Beyond", *Addison-Wesley, US. Chaper 5, XP-002381152*, (Jul. 15, 2003), 137-173.

Brown, Douglas W., "A State-Machine Synthesizer", *18th Design Automation Conference*, (1981),301-305.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP 002185193 (1999), pp. 1-7.

Claudio DeSanti, "Virtual Fabrics Switch Support"; VF Switch Support, T11/04-395v2. Sep. 2004, pp. 1-15.

Pelissier et al, "Inter-Fabric Routing", dated Jul. 30, 2004, Inter Fabric Routing (04-520v0); pp. 1-31.

DeSanti et al, "Virtual Fabrics"; Virtual Fabrics, T11/03-352v0, May 2003; pp. 1-4.

Martin et al , "Virtual Channel Architecture", Presentation by Brocade to T11/03-369V0 dated Jun. 2, 2003.

U.S. Appl. No. 10/266,360, filed Oct. 7, 2002, Method And System For Reducing Congestion In Computer Networks.

U.S. Appl. No. 10/241,153, filed Sep. 11, 2002, Zone Management In A Multi-Module Fibre Channel Switch.

U.S. Appl. No. 10/263,858, filed Oct. 3, 2002, Method And System For Using Distributed Name Servers In Multi-Module Fibre Channel Switching.

U.S. Appl. No. 10/212,425, filed Aug. 5, 2002, Method And System For Flexible Routing In A Fibre Channel System.

U.S. Appl. No. 10/302,149, filed Nov. 22, 2002, Method And System For Controlling Packet Flow In Networks.

U.S. Appl. No. 10/894,579, filed Jul. 20, 2004, Method and System for Managing Traffic in Fibre Channel Switches.

U.S. Appl. No. 10/894,546, filed Jul. 20, 2004, Method and System for Routing and Filtering Network Data Packets in Fibre Channel Systems.

U.S. Appl. No. 10/894,827, filed Jul. 20, 2004, Method and System for Selecting Virtual Lanes in Fibre Channel Switches.

U.S. Appl. No. 10/894,597, filed Jul. 20, 2004, Programmable Pseudo Virtual Lanes for Fibre Channel Systems.

U.S. Appl. No. 10/894,595, filed Jul. 20, 2004, Method and System for Reducing Latency and Congestion in Fibre Channel Switches.

U.S. Appl. No. 10/664,548, filed Sep. 19, 2003, Buffer to Buffer Credit Recovery for In-Line Fibre Channel Credit Extension Devices.

U.S. Appl. No. 10/895,175, filed Jul. 20, 2004, Method and System for Detecting Congestion and Over Subscription in a Fibre Channel Network.

U.S. Appl. No. 10/894,492, filed Jul. 20, 2004, LUN Based Hard Zoning in Fibre Channel Switches.

U.S. Appl. No. 10/894,587, filed Jul. 20, 2004, Multi Speed Cut Through Operation in Fibre Channel Switches.

U.S. Appl. No. 10/894,726, filed Jul. 20, 2004, Method and System for Improving Bandwidth & Reducing Idles in Fibre Channel Switches.

U.S. Appl. No. 10/894,629, filed Jul. 20, 2004, Method and System for Routing Fibre Channel Systems.

U.S. Appl. No. 10/894,491, filed Jul. 20, 2004, Method and System for Keeping a Fibre Channel Arbitrated Loop Open During Frame Gaps.

U.S. Appl. No. 10/894,536, filed Jul. 20, 2004, Method And System For Congestion Control Based On Optimum Bandwidth Allocation In A Fibre Channel Switch.

U.S. Appl. No. 10/894,627, filed Jul. 20, 2004, Method and System for Programmable Data Dependent Network Routing.

U.S. Appl. No. 10/719,077, filed Nov. 21, 2003, Method and System for Monitoring Events in Storage Area Networks.

U.S. Appl. No. 10/894,689, filed Jul. 20, 2004, Method and System for Power Control of Fibre Channel Switches.

U.S. Appl. No. 10/798,527, filed Mar. 11, 2004, Method and

System for Preventing Deadlock in Fibre Channel Fabrics using Frame Priorities.
U.S. Appl. No. 10/798,468, filed Mar. 11, 2004, Method and System for Reducing Deadlock in Fibre Channel Fabrics using Virtual Lanes.
U.S. Appl. No. 10/894,586, filed Jul. 20, 2004, Method and System for Buffer to Buffer Credit recovery in Fibre Channel Systems Using Virtual and/or Pseudo Virtual Lane.
U.S. Appl. No. 10/889,635, filed Jul. 12, 2004, Method And System For Inexpensive And Non-Disruptive Data Capture In Networks.
U.S. Appl. No. 10/889,337, filed Jul. 12, 2004, Method And System For Minimizing Disruption In Common-Access Networks.
U.S. Appl. No. 10/889,259, filed Jul. 12, 2004, Method And Apparatus For Detecting And Removing Orphaned Primitives In A Fibre Channel Network.
U.S. Appl. No. 10/889,267, filed Jul. 12, 2004, Method And System For Fibre Channel Arbitrated Loop Acceleration.
U.S. Appl. No. 10/889,256, filed Jul. 12, 2004, Method and Apparatus For Accelerating Receive-Modify-Send Frames In A Fibre Channel Network.
U.S. Appl. No. 10/889,255, filed Jul. 12, 2004, Method and Apparatus for Test Pattern Generation.
U.S. Appl. No. 10/889,588, filed Jul. 12, 2004, Method And Apparatus For Improving Buffer Utilization In Communication Networks.
U.S. Appl. No. 10/894,597, filed Jul. 20, 2004, Method And System For Using Extended Fabric Features With Fibre Channel Switch Elements.
U.S. Appl. No. 10/894,978, filed Jul. 20, 2004, Method And System for Programmable Data Dependent.
U.S. Appl. No. 10/894,917, filed Jul. 20, 2004, Method and System for Configuring Fibre Channel Ports.
U.S. Appl. No. 10/894,529, filed Jul. 20, 2004, Integrated Fibre Channel Fabric Controller.
U.S. Appl. No. 10/894,732, filed Jul. 20, 2004, Method And System For Congestion Control In A Fibre Channel Switch.
U.S. Appl. No. 10/957,465, filed Oct. 1, 2004, Method and System for Using Boot Servers in Fibre Channel Network Routing.
U.S. Appl. No. 10/956,717, filed Oct. 1, 2004, Method and System for Transferring Data directly between storage devices in a Storage Area Networks.
U.S. Appl. No. 10/956,501, filed Oct. 1, 2004, High Speed Fibre Channel Switch Elements.
U.S. Appl. No. 10/956,502, filed Oct. 1, 2004, Method and System for LUN Remapping in Fibre Channel Networks.
U.S. Appl. No. 10/961,463, filed Oct. 8, 2004, Fibre Channel Transparent Switch For Mixed Switch Fabrics.
U.S. Appl. No. 10/956,718, filed Oct. 1, 2004, Method and System for Using an In-Line Credit Extender with a Host Bus Adapter.
"Examination Report from the European Patent Office dated Oct. 12, 2007 for European Application No. 05 805 632.6".
"Office Action from USPTO dated Jul. 11, 2007 for U.S. Appl. No. 10/263,858".
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Jul. 3, 2007 for U.S. Appl. No. 10/664,548".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
Malavalli; et al., "Fibre Channel Framing and Signaling (FC-FS) Rev 1.10", *NCITS working draft proposed American National Standard for Information Technology*, (Jan. 25, 2001).
Curtis, A. R., "Design Considerations for 10-Gbit Fibre Channel", *Curtis A. Ridgeway, Distinguished I/O Architect, Storage and Computing ASIC's Division, LSI Logic Corp.*, 2003.
Malavalli, Kumar, "High Speed Fibre Channel Switching Fabric Devices", *Proceedings of the SPIE, SPIE*, Bellingham, VA, USA vol. 1577,, XP000562869, ISSN: 0277-786X,(Sep. 4, 1991), 216-226.

Melhem, et al., "Minimizing Wavelength Conversions in WDM Path Establishment", *Computer Science Department, University of Pittsburgh*, Pittsburgh, PA 15260, (2001), 197-211.

Ridgeway, Curt, "0GFC-40GFC using 4-lane XAUI's", *LSI Logic Presentation—T11/03-069v0*, Feb. 3, 2003.

* cited by examiner

# METHOD AND APPARATUS FOR TESTING LOOP PATHWAY INTEGRITY IN A FIBRE CHANNEL ARBITRATED LOOP

CROSS-REFERENCE TO RELATED APPLICATIONS

This application claims priority under 35 USC Section 119(e), to the following provisional patent applications:
Ser. No. 60/487,876 filed on Jul. 16, 2003;
Ser. No. 60/487,887 filed on Jul. 16, 2003;
Ser. No. 60/487,875 filed on Jul. 16, 2003;
Ser. No. 60/490,747 filed on Jul. 29, 2003;
Ser. No. 60/487,667 filed on Jul. 16, 2003;
Ser. No. 60/487,665 filed on Jul. 16, 2003;
Ser. No. 60/492,346 filed on Aug. 4, 2003; and
Ser. No. 60/487,873 filed on Jul. 16, 2003.

The disclosures of the foregoing applications are incorporated herein by reference in their entirety.

BACKGROUND

1. Field of the Invention

The present invention relates to networks, and more particularly to performing loop pathway integrity checks in a fibre channel arbitrated loop topology.

2. Background of the Invention

Fibre channel is a set of American National Standard Institute (ANSI) standards, which provide a serial transmission protocol for storage and network protocols such as HIPPI, SCSI, IP, ATM and others. Fibre channel provides an input/output interface to meet the requirements of both channel and network users.

Fibre channel supports three different topologies: point-to-point, arbitrated loop and fibre channel fabric. The point-to-point topology attaches two devices directly. The arbitrated loop topology attaches devices in a loop. The fibre channel fabric topology attaches host systems directly to a fabric, which are then connected to multiple devices. The fibre channel fabric topology allows several media types to be interconnected.

Fibre channel is a closed system that relies on multiple ports to exchange information on attributes and characteristics to determine if the ports can operate together. If the ports can work together, they define the criteria under which they communicate.

In fibre channel, a path is established between two nodes where the path's primary task is to transport data from one point to another at high speed with low latency, performing only simple error detection in hardware.

FC-AL is one fibre channel standard (incorporated herein by reference in its entirety) that establishes the protocols for an arbitrated loop topology. In a conventional FC-AL implementation there can be as many as 128 ports on the FC-AL loop. The data path consists of several transmit and receive paths.

During normal loop operation when Fibre Channel devices are connected, internal data path error, external data path error or interconnection error can cause a failure. Conventional systems do not have testing methods that isolate internal failure from an external failure or interconnection failure. A device causing a failure cannot be isolated using parity checking alone, other more robust testing methods like a CRC check are needed Conventional fabric elements in a FC-AL topology are not robust and do not provide an efficient way to identify, isolate and manage loop traffic.

One such problem is shown in system 210 of FIG. 2B. System 210 includes a fibre channel element (or a switch) 216 that couples host systems 213-215 to storage systems 217 and 218. Storage system 217 and 218 include redundant array of independent disks (RAID) 211 coupled via plural input/output ("I/O") modules and RAID controllers 201A and 201B. If drive 219 is defective, it may disrupt all traffic in common-access network 220. This can result in loop failure and lower performance of the overall network.

Another example is shown in FIG. 2A, where a RAID controller 201 is coupled to two different loops 209A and 208A via links 209 and 208 in a disk array system 200. Each loop has a small computer systems interface (SCSI) enclosure services ("SES") module 202 and 202A. SES modules 202 and 202A comply with the SES industry standard that is incorporated herein by reference in its entirety.

Port bypass controller ("PBC") modules 203 (and 206) couple plural disks (for example, 204, 202B and 207) and link 205 couples the PBC modules.

If drive 202B, which is dual ported, fails then both loops 209A and 208A are disrupted. Again, conventional techniques will require that storage 202A be removed and a bypass command issued to all drives, which takes the entire array off-line. Each device is attached and detached to investigate the reason for a link failure. Then all the drives, except the faulty drive are re-attached and loop activity is restored. This system of trial and error is labor intensive and inefficient.

Another drawback in conventional Fibre Channel networks is that loop functional test patterns and automatic test pattern generators ("ATPG") are used to check individual L_PORTS. Conventional systems do not provide any tests that can check the entire FC-AL loop integrity. Also, there are no pattern generators that can generate an actual Fibre Channel frame with the correct encoding and disparity, consisting of a SOF, Header, Payload, correct Fibre Channel CRC, and EOF to check individual port integrity. Furthermore, de-bugging is performed on a trial and error basis when any failure occurs. Failures are debugged on a board one port at a time, which is tedious and time consuming and hence commercially undesirable.

Therefore, there is a need for a method and system for efficiently detecting FC-AL integrity.

SUMMARY OF THE INVENTION

A method for performing a fibre channel arbitrated loop integrity test using a fibre channel switch element is provided. The method includes, sending a fibre channel frame through the arbitrated loop; receiving the fibre channel frame after it has traversed through the arbitrated loop; performing a data compare between the fibre channel frame that was sent and the fibre channel frame that is received; detecting internal errors, if any, in the traversed fibre channel loop; and isolating a module that may have generated the error.

The method also includes detecting interconnection data path errors between fibre channel switch elements, if the frame is received without any internal errors. The internal errors are checked in a transmission protocol engine port of the fibre channel switch elements. Plural fibre channel switch elements are coupled to each other using a cascade port and the fibre channel frame is allowed to traverse through the plural fibre channel switch element.

In yet another aspect of the present invention, a fibre channel switch element coupled to an arbitrated loop is provided. The switch element includes, a cascade port that is used to couple one fibre channel switch element to another in a loop; and a port that sends a fibre channel frame through the loop and compares the fibre channel frame that was sent and the fibre channel frame that is received; and detects internal errors based on the comparison and isolates a module that may have generated the internal error.

The switch element detects inter-connection data path errors between fibre channel switch elements, if the frame is received without any internal errors.

In yet another aspect of the present invention, a system for performing integrity tests in a fibre channel arbitrated loop is provided. The system includes, a fibre channel switch element including a host port, a cascade port, a generic port for performing diagnostic services, wherein plural fibre channel switch elements are cascaded in a loop and the generic port sends a fibre channel frame through the loop and a compares the fibre channel frame that was sent and the fibre channel frame that is received; and detects internal errors based on the comparison and a isolates a module that may have generated the internal error.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Definitions:

The following definitions are provided as they are typically (but not exclusively) used in the fibre channel environment, implementing the various adaptive aspects of the present invention.

"AL_PA": Arbitrated loop physical address.

"FC-AL": Fibre channel arbitrated loop process described in FC-AL standard.

"Fibre channel ANSI Standard": The standard describes the physical interface, transmission and signaling protocol of a high performance serial link for support of other high level protocols associated with IPI, SCSI, IP, ATM and others.

"FC-1": Fibre channel transmission protocol, which includes serial encoding, decoding and error control.

"FC-2": Fibre channel signaling protocol that includes frame structure and byte sequences.

"FC-3": Defines a set of fibre channel services that are common across plural ports of a node.

"FC-4": Provides mapping between lower levels of fibre channel, IPI and SCSI command sets, HIPPI data framing, IP and other upper level protocols.

"LIP": Loop initialization protocol primitive.

"L_Port": A port that contains Arbitrated Loop functions associated with the Arbitrated Loop topology.

"SES": SCSI Enclosure Services.

"TPE": Transmission Protocol Engine, a controller that operates at the FC-1 level.

To facilitate an understanding of the preferred embodiment, the general architecture and operation of a fibre channel system will be described. The specific architecture and operation of the preferred embodiment will then be described with reference to the general architecture of the fibre channel system.

Figure 1:
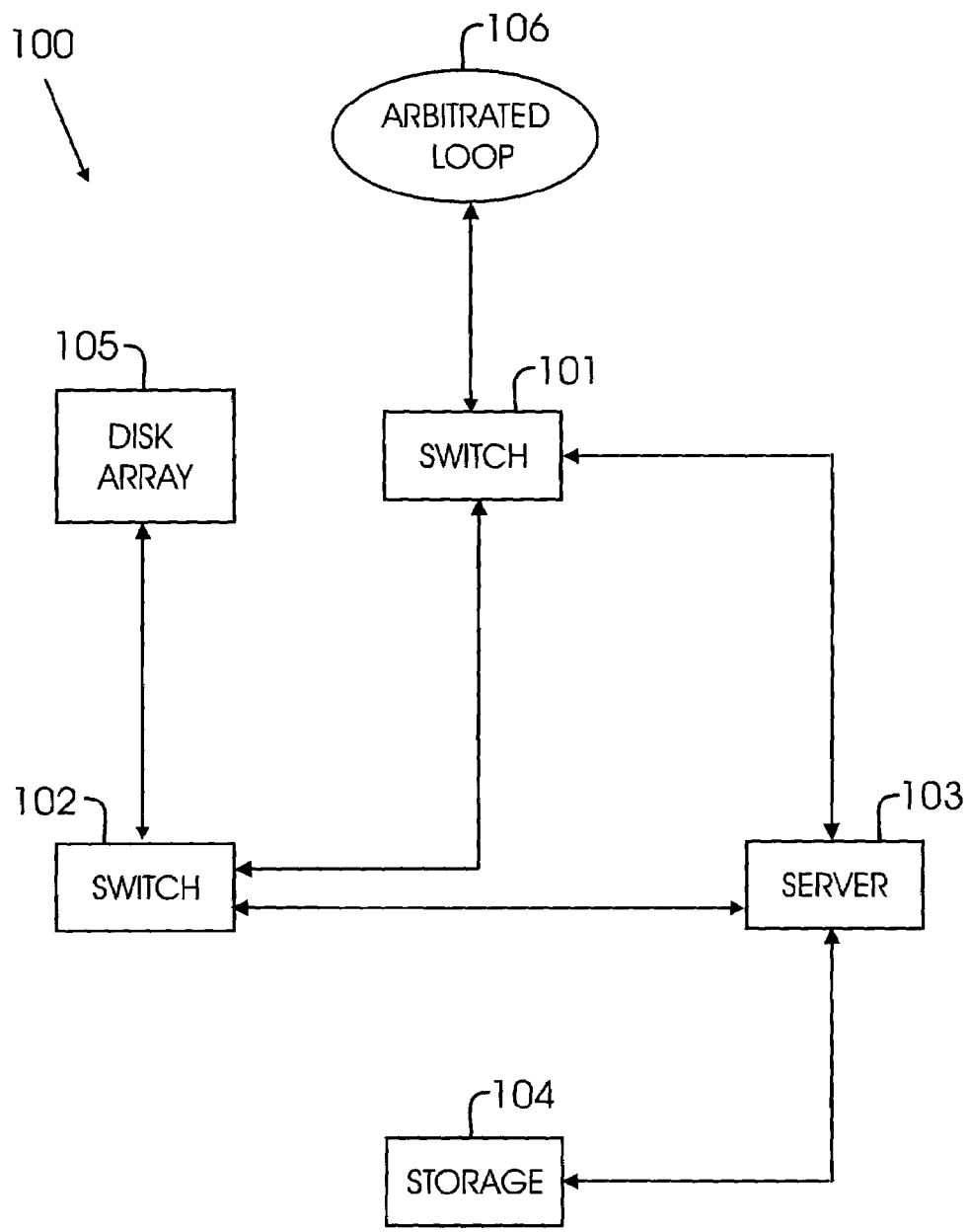
FIG. 1 shows a block diagram of a storage area network.
Figure 2A:
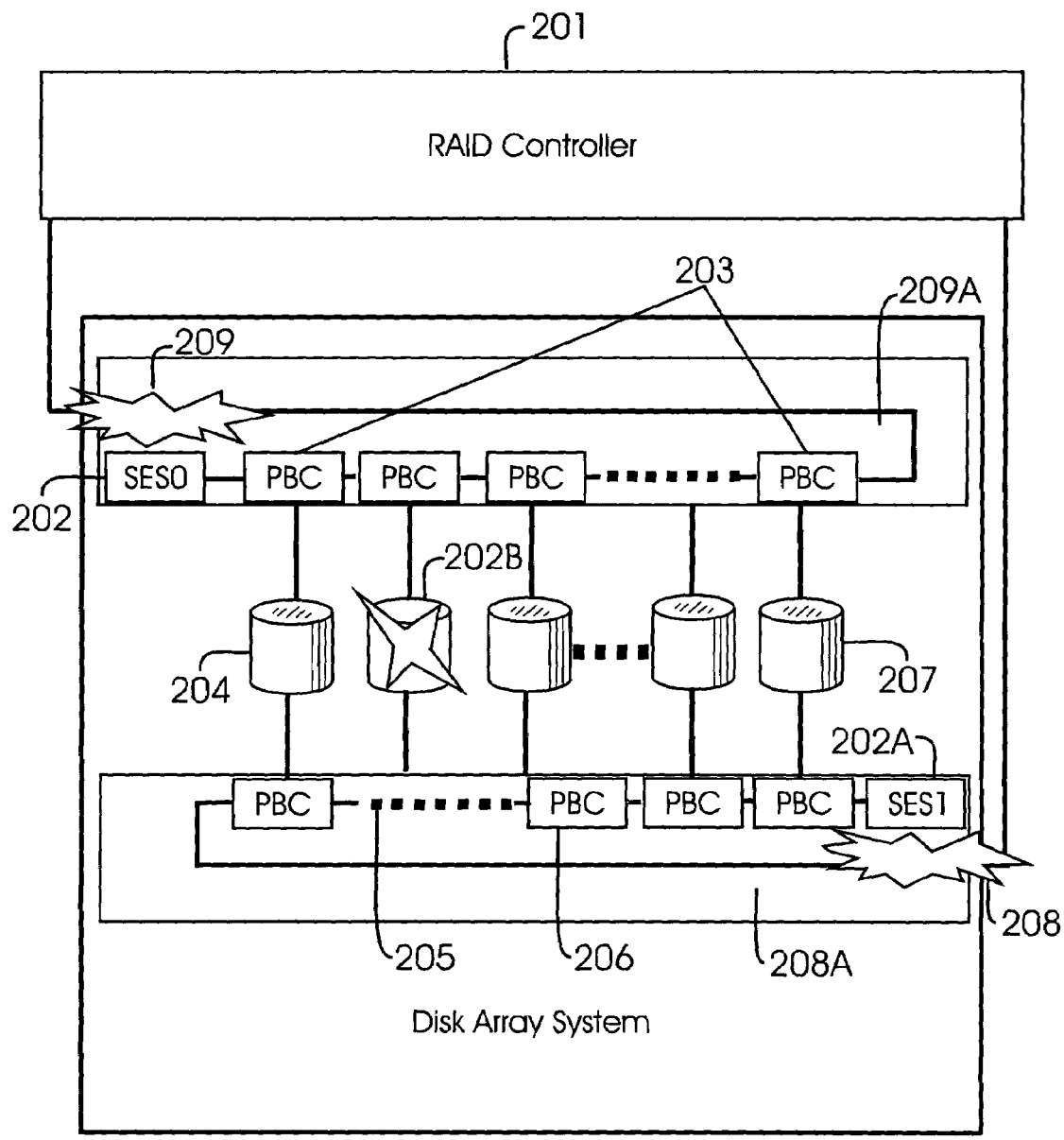
FIGS. 2A/2B and 3 show configurations that use the adaptive aspects of the present invention.
Figure 2B:
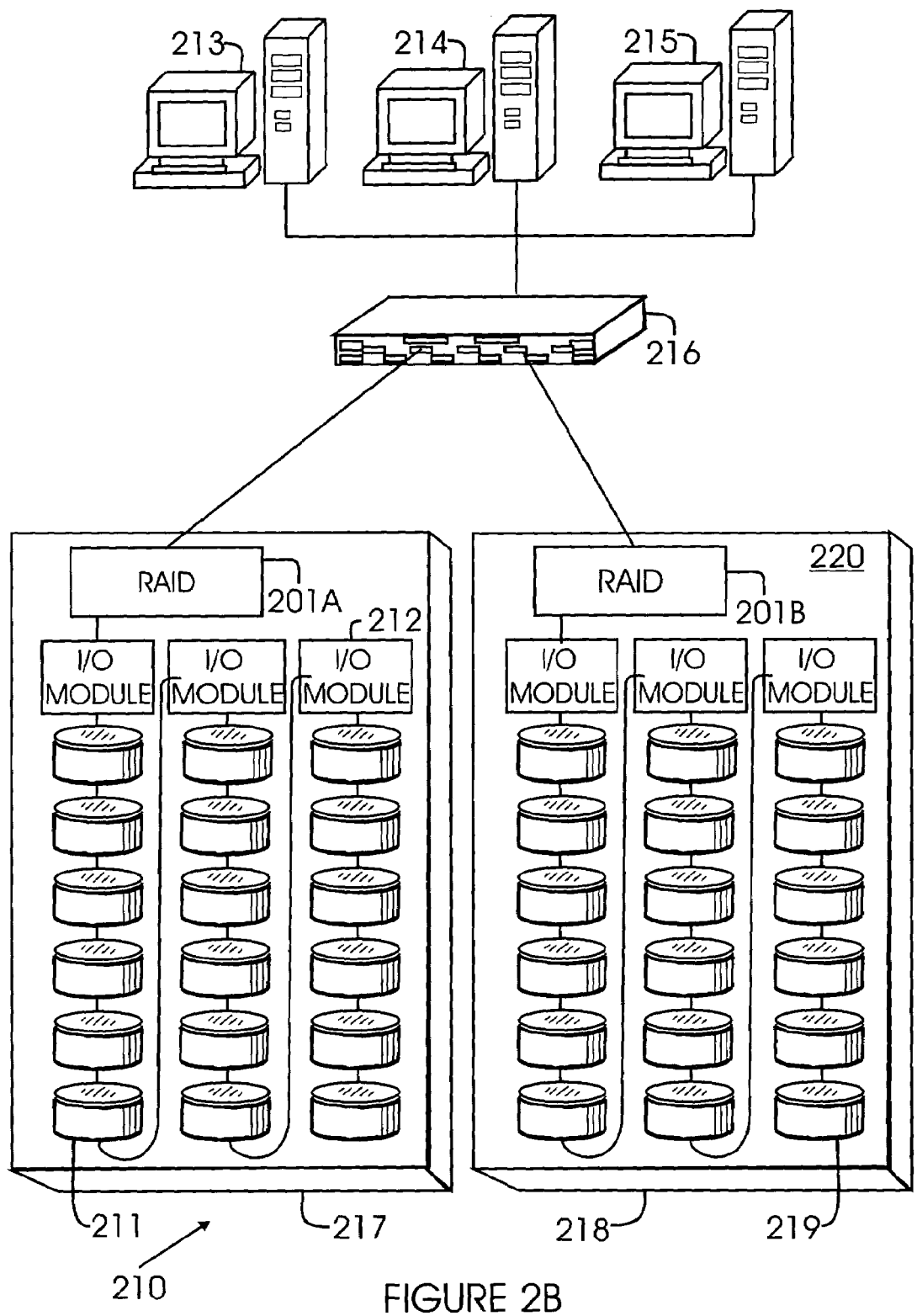

FIG. 1 is a block diagram of a fibre channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Ports).

The devices of FIG. 1 are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Figure 3:
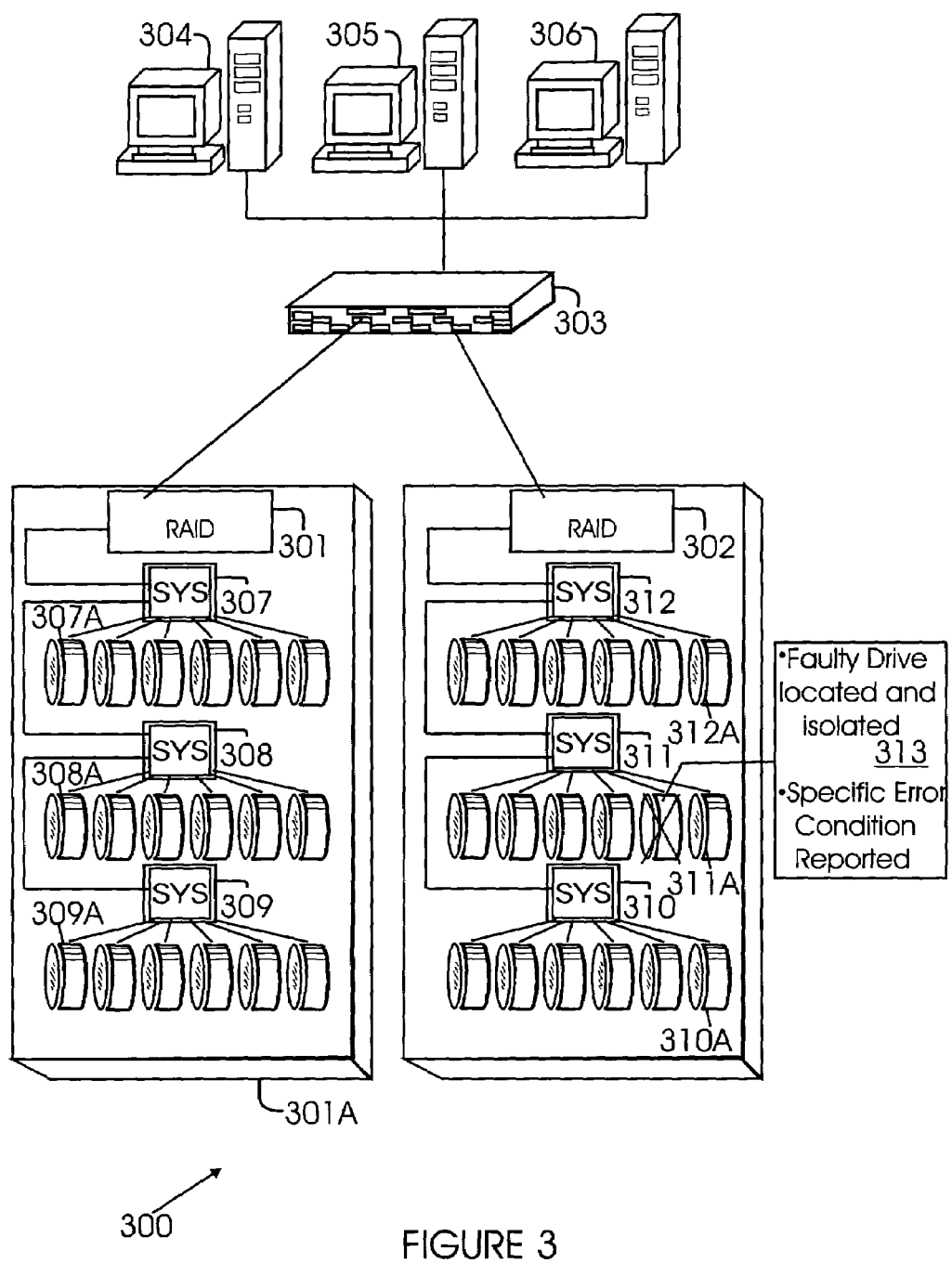

FIG. 3 shows a block diagram of the top-level architecture for system 300 according to one aspect of the present invention. System 300 includes system 307 (a Fibre Channel element) operationally coupled to an array of storage devices 307A that is coupled to a RAID controller 301. RAID system 301A is coupled to switch 303 that is coupled to various computing systems (304-306). System 308, 309, 310, 311 and 312 coupled to storage devices 308A, 309A, 310A, 311A and 312A, are similar to 307/307A configuration.

System 307 (or 308-312) allows faulty disks to be easily segregated. For example, if a drive 313 in string 311A is faulty, then system 311 allows drive 313 to be separated, while normal traffic in arrays 301A and 310A continues.

Figure 4A:
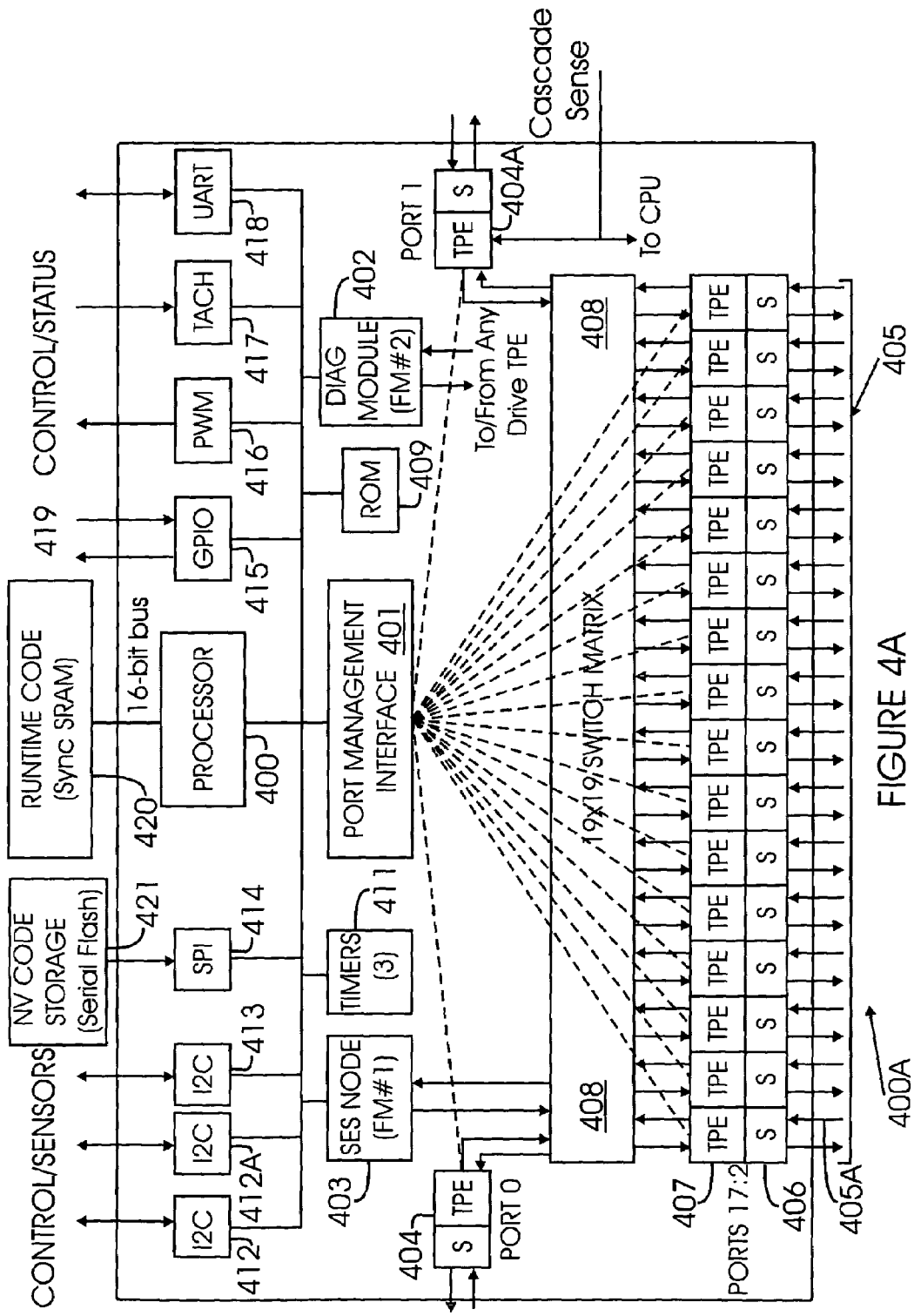
FIG. 4A shows a block diagram of a switch element, according to one aspect of the present invention

FIG. 4A is a block diagram of an 18-port ASIC FC element 400A (also referred to as system 307) according to one aspect of the present invention. FC element 400A provides various functionality in an FC_AL environment, including without limitation, FC element 400A operates as a loop controller and loop switch using switch matrix 408, in accordance with the FC-AL standard.

FC element 307 of the present invention is presently implemented as a single CMOS ASIC, and for this reason the term "FC element" and ASIC are used interchangeably to refer to the preferred embodiments in this specification. Although FIG. 4A shows 18 ports, the present invention is not limited to any particular number of ports.

System 400A provides a set of port control functions, status indications, and statistics counters for monitoring the health of the loop and attached devices, diagnosing faults, and recovering from errors.

ASIC 400A has 18 ports where 16 ports are shown as numeral 405 while a host port 404 and cascade port 404A are shown separately for convenience only. These ports are generic to common Fibre Channel port types, for example, L_Ports.

For illustration purposes only, all ports are drawn on the same side of ASIC 400A in FIG. 4A. However, the ports may be located on any side of ASIC 400A. This does not imply any difference in port or ASIC design. Actual physical layout of the ports will depend on the physical layout of the ASIC.

Each port has transmit and receive connections to switch matrix 408 and includes transmit protocol engine 407 and a serial/deserializer 406. Frames enter/leave the link 405A and SERDES 406 converts data into 10-bit parallel data to fibre channel characters.

Switch matrix 408 dynamically establishes a connection for loop traffic. Switch matrix 408 includes a global arbiter (hence switch matrix 408 is also referred to as SGA 408) that provides lower latency and improved diagnostic capabilities while maintaining full Fibre Channel Arbitrated Loop (FC-AL) compliance.

Switch matrix 408 provides a quasi-direct architecture in the form of a buffer-less Switch Matrix. Switch matrix 408 includes data multiplexers that provide a path to each port. In one aspect, twenty multiplexers may be used. In one aspect, data is 16 bits wide plus the internal "K" control signal and two parity bits.

At power-up, SGA 408 is setup in a flow-through configuration, which means all ports send what was received on host port 404. When a valid LIP sequence occurs, SGA 408 configures the switch to a complete loop configuration for the address selection process. During normal data transfer on the loop, SGA 408 reconfigures the switch data-path to connect the active ports in what appears as a smaller loop, which lowers the latency but still emulates FC-AL functionality to all entities on the loop.

During loop configuration, SGA 408 configures the switch data-path to include a snooping port that walks through each port during the LIP physical address assignment to track each port's assigned arbitrated loop physical address (AL_PA). This snooping process is called the 'LIP walk'. When the LIP process is done, the firmware records the "port to AL_PA" map in an internal table built in SGA 408. During normal data transfer mode, SGA 408 monitors arbitration requests, open requests, and close primitives to determine which ports have traffic that must be forwarded. The ports that have traffic for the loop provide the necessary information to create the connection points for the switch data-path. The inactive ports are provided the primitive ARB(F0).

SGA 408 creates a direct loop connection between source and destination devices. This connection methodology avoids the delay associated with data having to pass from one disk drive member of the loop to the next until the data has completed traversing the loop.

System 400A includes plural I2C (I2C standard compliant) interfaces 412-413 that allow system 307 to couple to plural I2C ports each having a master and slave capability. Timer module 411 is provided for controlling timer operations.

System 400A also includes a general-purpose input/output interface ("GPIO") 415. This allows information from system 307 to be analyzed by any device that can use GPIO 415. Control/Status information 419 can be sent or received through module 415.

System 400A also includes a SPI module 414 that is used for parallel to serial and serial to parallel transfer between processor 400 firmware and flash memory 421 in the standard Little Endian format.

System 400A also includes a Universal Asynchronous Receiver/Transmitter ("UART") interface 418 that converts serial data to parallel data (for example, from a peripheral device modem or data set) and vice-versa (data received from processor 400) complying industry standard requirements.

System 400A can also process tachometer inputs (received from a fan, not shown) using module 417. Processor 400 can read the tachometer input via a tachometer rate register and status register (not shown).

System 400A provides pulse width modulator ("PWM") outputs via module 416. Processor 400 can program plural outputs.

System 400A also includes two frame manager modules 402 and 403 that are similar in structure. Processor 400 can access runtime code from memory 420 and input/output instructions from read only memory 409.

Module 402 (also referred to as the "diag module 402") is a diagnostic module used to transfer diagnostic information between a FC-AL and the firmware of system 400A.

Diag module 402 is functionally coupled to storage media (via ports 405) via dedicated paths outside switch matrix 408 so that its connection does not disrupt the overall loop. Diag module 402 is used for AL_PA capture during LIP propagation, drive(s) (coupled to ports 405) diagnostics and frame capture.

Module 403 (also referred to as "SES module 403") complies with the SES standard and is functionally coupled to host port 404 and its output is routed through switch matrix 408. SES module 403 is used for in-band management services using the standard SES protocol.

When not bypassed, modules 402 and 403 receive primitives, primitive sequences, and frames. Based on the received traffic and the requests from firmware, modules 402 and 403 maintain loop port state machine (LPSM) (615, FIG. 6B) in the correct state per the FC-AL standard specification, and also maintain the current fill word.

Based on a current LPSM 615 state (OPEN or OPENED State), modules 402 and 403 receive frames, pass the frame onto a buffer, and alert firmware that a frame has been received. Module 402 and 403 follow FC-AL buffer to buffer credit requirements.

Firmware may request modules 402 and 403 to automatically append SOF and EOF to the outgoing frame, and to automatically calculate the outgoing frame's CRC using CRC generator 612. Modules 402 and 403 can receive any class of frames and firmware may request to send either fibre channel Class 2 or Class 3 frames.

Figure 5A:
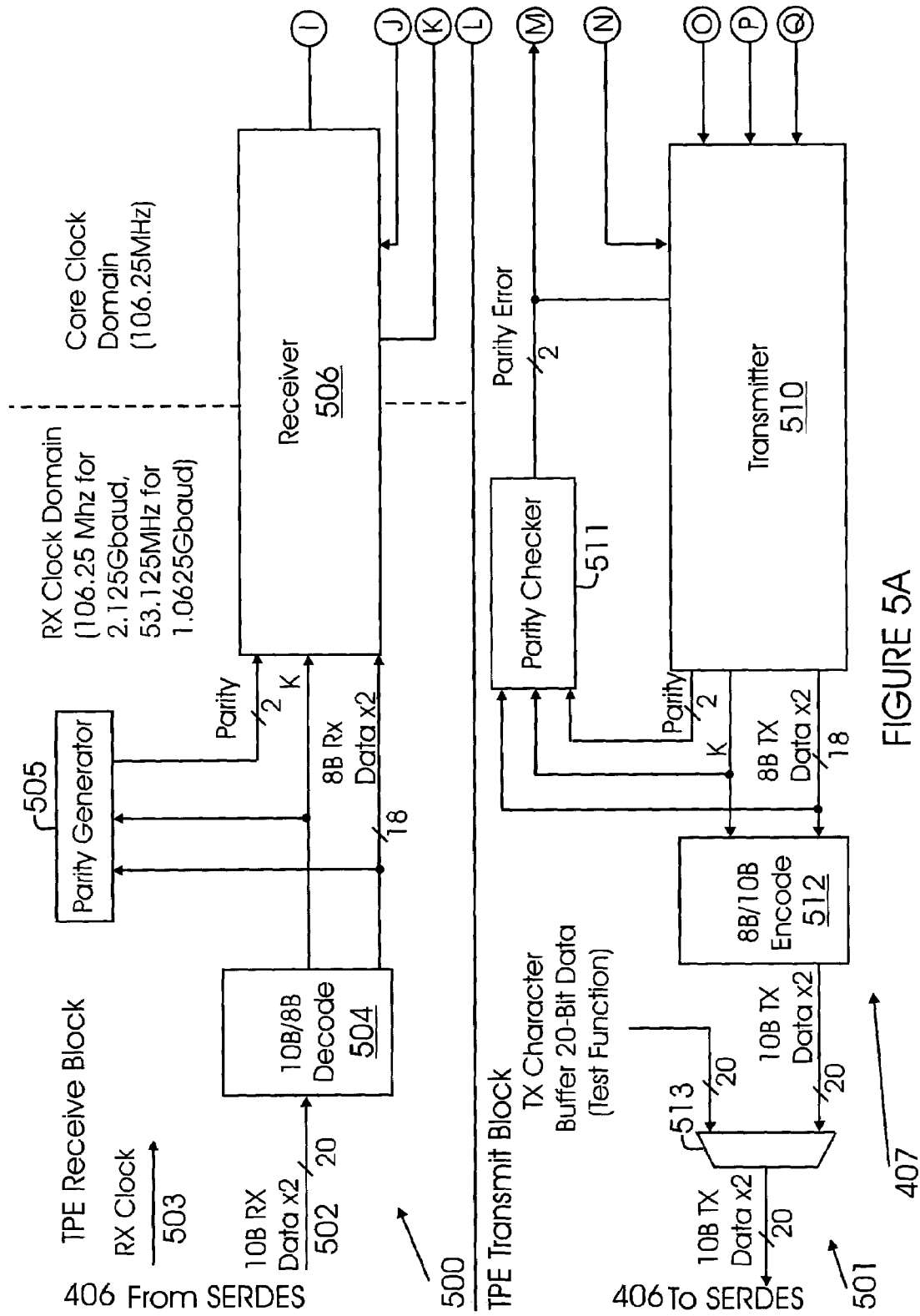
FIGS. 5A and 5B (jointly referred to as FIG. 5) show a block diagram of a transmission protocol engine, according to one aspect of the present invention.

Port Management Interface (PMIF) 401 allows processor 400 access to various port level registers, SerDes modules 406 and TPE Management Interfaces 509 (FIG. 5). PMIF 401 contains a set of global control and status registers, receive and transmit test buffers, and three Serial Control Interface (SCIF) controllers (not shown) for accessing SerDes 406 registers.

Figure 6A:
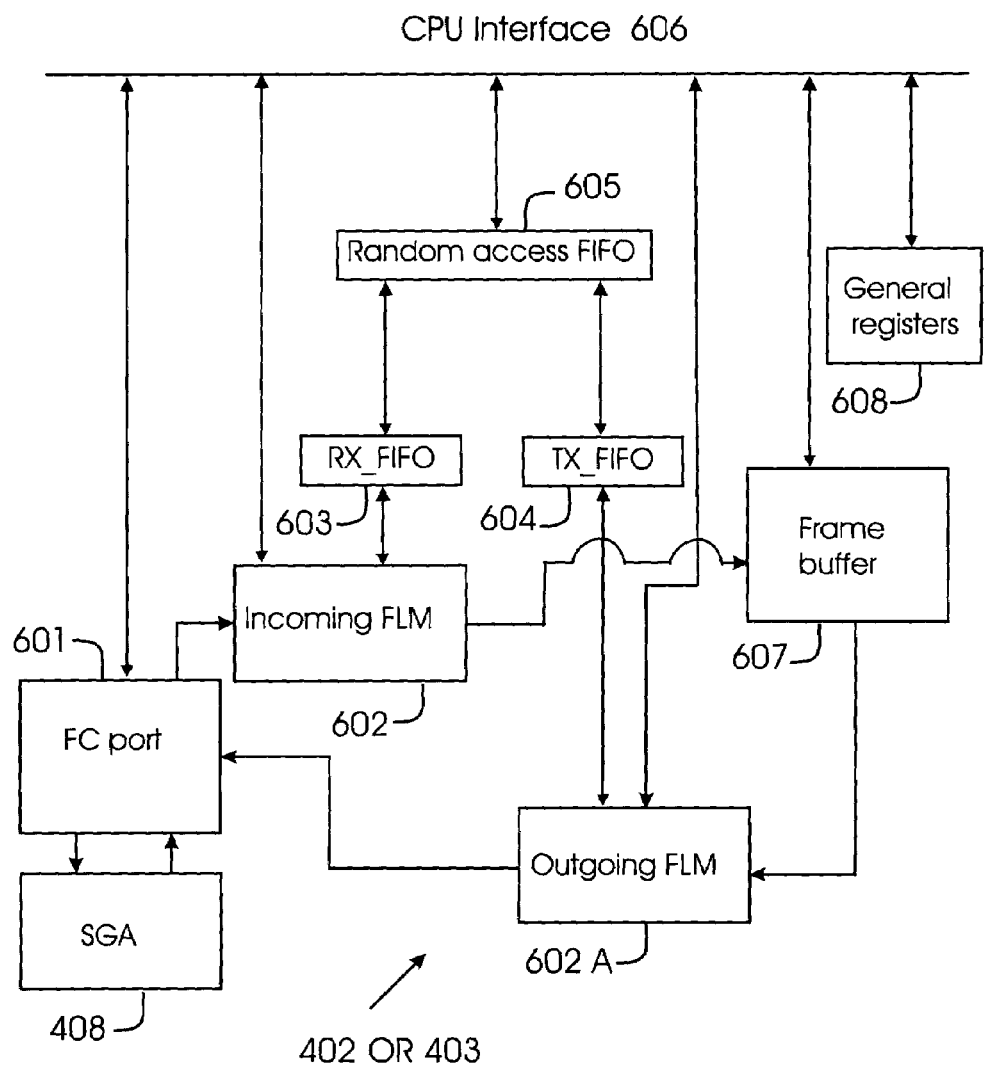
FIGS. 6A and 6B show block diagrams for a diagnostic module and a SES module, according to one aspect of the present invention.
Figure 6B:
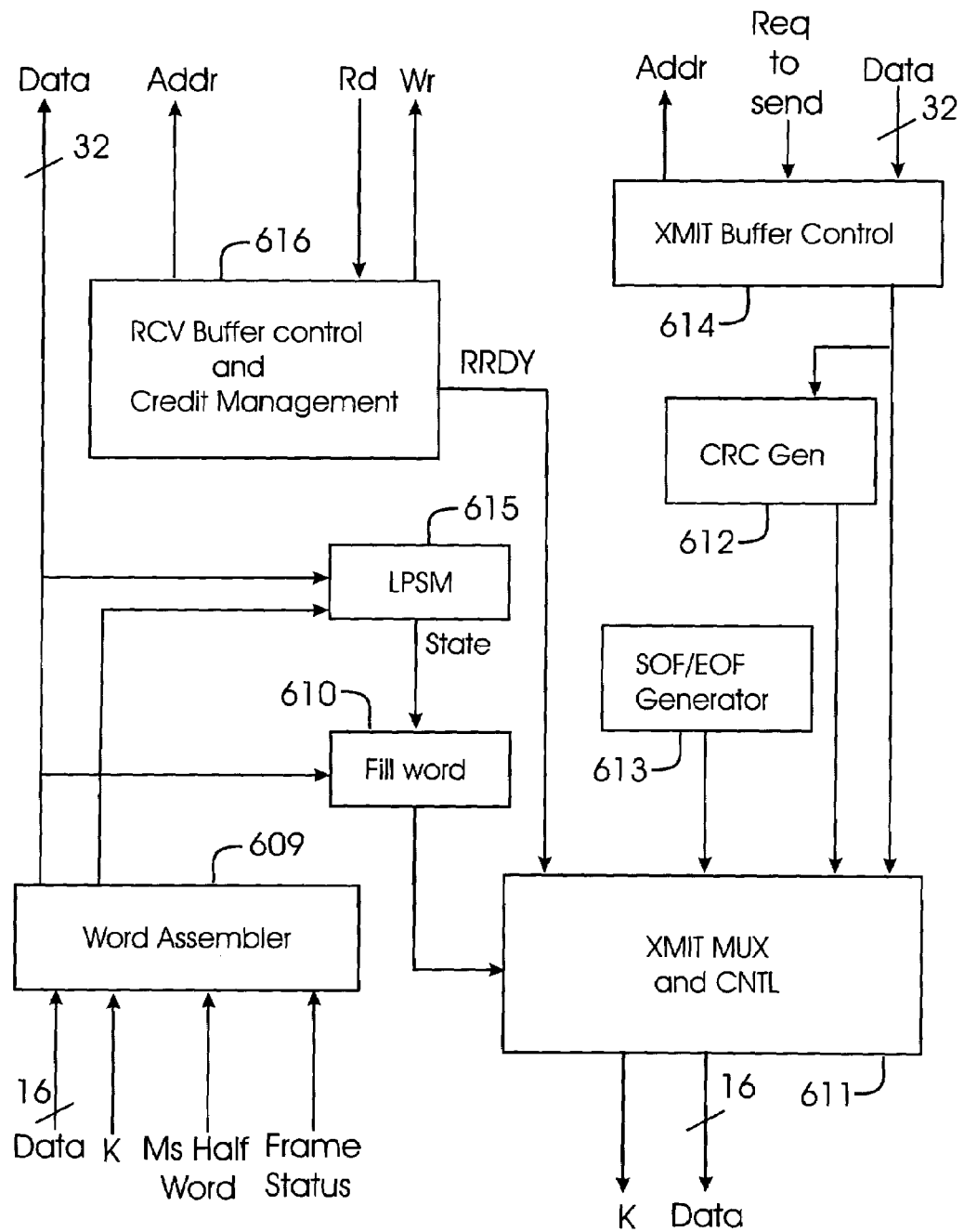

FIG. 6A and 6B show block diagrams for module 402 and 403. It is noteworthy that the structure in FIGS. 6A and 6B can be used for both modules 402 and 403. FIG. 6B is the internal data path of a FC port 601 coupled to modules 402/403.

Modules 402 and 403 interface with processor 400 via an interface 606. Incoming frames to modules 402 and 403 are received from port 601 (which could be any of the ports 404, 404A and 405) and stored in frame buffer 607. Outgoing frames are also stored in frame buffer 607. Modules 402 and 403 have a receive side memory buffer based on "first-in, first-out" principle, ("FIFO") RX_FIFO 603 and transmit side FIFO TX_FIFO 604 interfacing with random access FIFO 605. A receive side FIFO 603 signals to firmware when incoming frame(s) are received. A transmit side FIFO 604 signals to hardware when outgoing frames(s) are ready for transmission. A frame buffer 607 is used to stage outgoing frames and to store incoming frames. Modules 602 and 602A are used to manage frame traffic from port 601 to buffers 603 and 604, respectively.

Modules 402 and 403 use various general-purpose registers 608 for managing control, status and timing information.

Based on the AL_PA, modules 402 and 403 monitor received frames and if a frame is received for a particular module (402 or 403), it will pass the frame onto a receive buffer and alert the firmware that a frame has been received via a receive side FIFO 603. Modules 402 and 403 follow the FC-AL buffer-to-buffer credit requirements using module 616. Modules 402 and 403 transmit primitives and frames based on FC-AL rules. On request, modules 402 and 403 may automatically generate SOF and EOF during frame transmission (using module 613). On request, modules 402 and 403 may also automatically calculate the Cyclic Redundancy Code (CRC) during frame transmission, using module 612.

Overall transmission control is performed by module 611 that receives data, SOF, EOF and CRC. A word assembler module 609 is used to assemble incoming words, and a fill word module 610 receives data "words" before sending it to module 611 for transmission. Transmit buffer control is performed by module 614.

FIG. 5 shows a block diagram of the transmission protocol engine ("TPE") 407. TPE 407 maintains plural counters/registers to interact with drives coupled to ports 405. Each TPE 407 interacts with processor 400 via port manager interface 401.

Each Fibre Channel port of system 400A includes a TPE module for interfacing to with SerDes 406. TPE 407 handles most of the FC-1 layer (transmission protocol) functions, including 10B receive character alignment, 8B/10B encode/decode, 32-bit receive word synchronization, and elasticity buffer management for word re-timing and TX/RX frequency compensation.

SerDes modules 406 handle the FC-1 serialization and de-serialization functions. Each SerDes 406 port consists of an independent transmit and receive node. SerDes 406 and TPE 407 are capable of operating at both 1 (1.0625) and 2 (2.125) Gbaud with transmit and receive sections under independent frequency control to facilitate link speed negotiation.

TPE 407 has a receive module 500 (that operates in the Rx clock domain 503) and a transmit module 501. Data 502 is received from SERDES 406 and decoded by decoding module 504. A parity generator module 505 generates parity data. SGA interface 508 allows TPE to communicate with switch 514 or switch matrix 408. Interface 508 (via multiplexer 507) receives information from a receiver module 506 that receives decoded data from decode module 504 and parity data from module 505.

Management interfaces module 509 interfaces with processor 400. Transmit module 501 includes a parity checker 511, a transmitter 510 and an encoder 512 that encodes 8-bit data into 10-bit data. 10-bit transmit data is sent to SERDES 406 via multiplexer 513.

Port Management Interface (PMIF) 401 allows processor 400 access to various port level registers, SerDes modules 406 and TPE Management Interfaces 509 (MIFs). PMIF 401 contains a set of global control and status registers, receive and transmit test buffers, and three Serial Control Interface (SCIF) controllers (not shown) for accessing SerDes 406 registers.

Figure 4B:
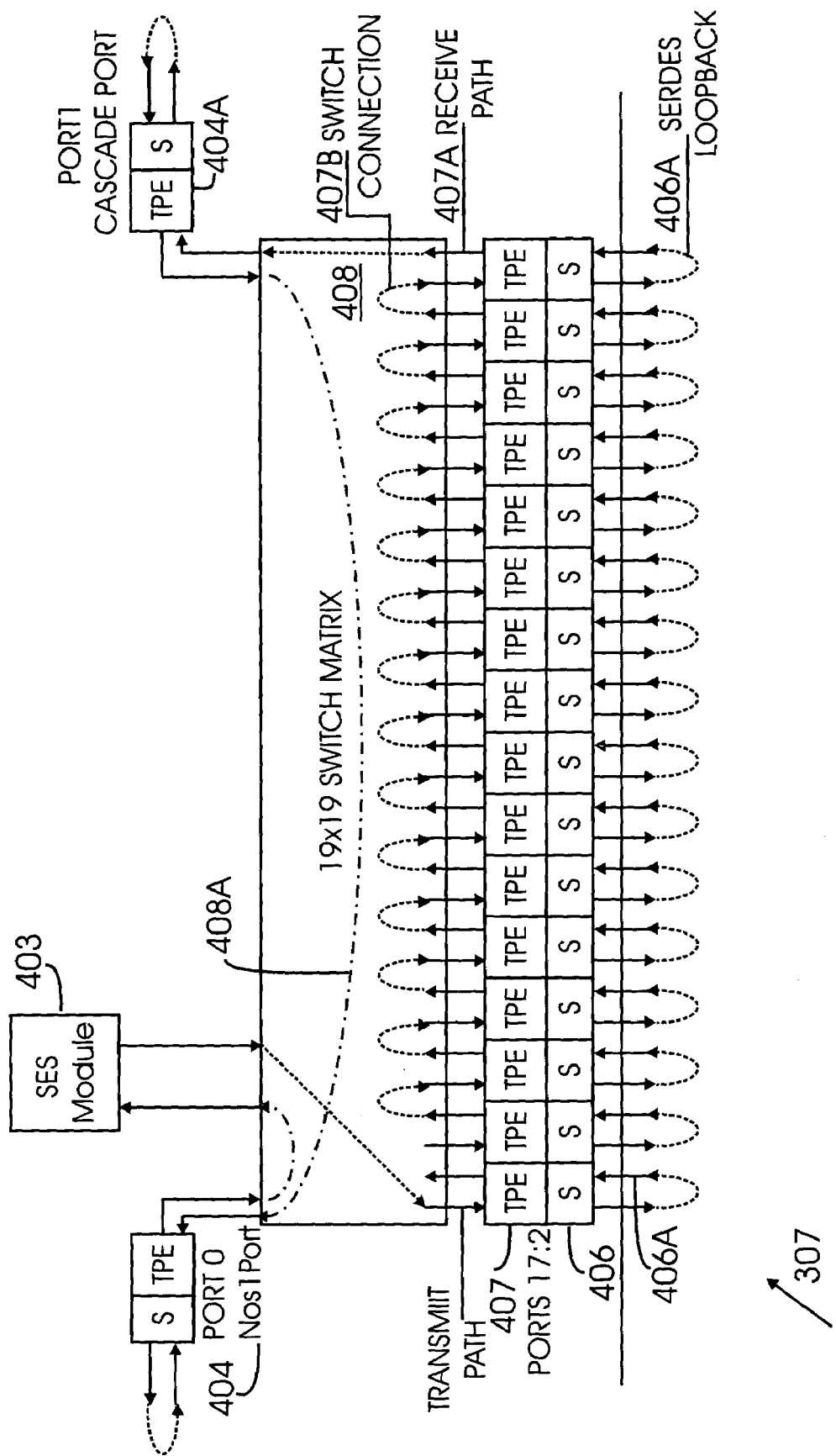
FIG. 4B shows block diagram of a switch element with an internal loop, according to one aspect of the present invention.

In one aspect of the present invention, FC-AL integrity checks can be performed for internal and external data paths. L_PORTS are connected inside a switch from a receive path of one port to a transmit path of the next port. Each port has an internal loop back inside the SERDES (406A, as shown in FIG. 4B). FIG. 4B also show host port 404 coupled to SGA 408 and via path 408A is coupled to cascade port 404A. Internal switch connection is shown as 407B and the receive path is shown as 407A.

Connecting the last cascade port to a first system 307 completes the loop. Host and Cascade ports are used to make external connections between plural systems 307, as shown in FIG. 7.

Figure 7:
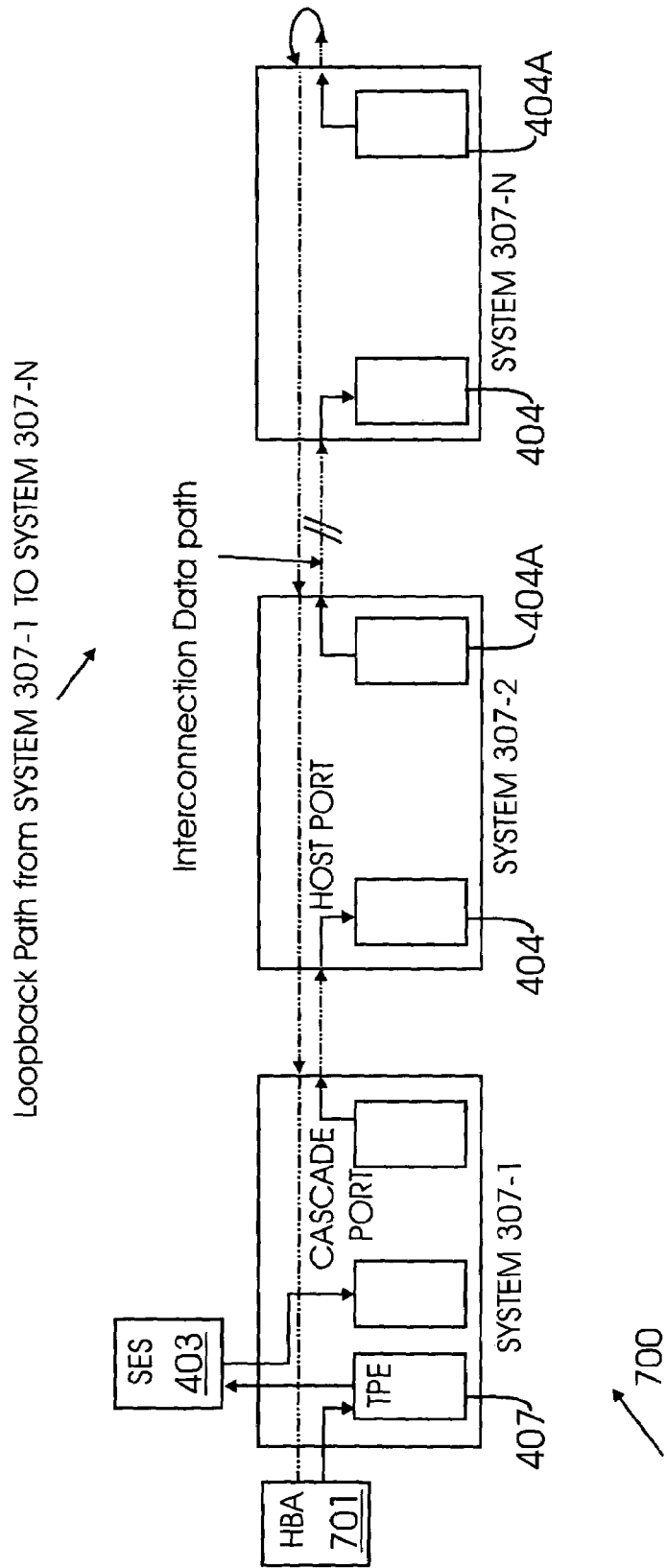
FIG. 7 shows a block diagram of plural fibre channel switch elements used to couple plural devices, according to one aspect of the present invention.

In FIG. 7, system 700 includes plural system 307 (shown as 307-1 to 307-N). A host bus adapter "HBA" ("701") is also shown that is located in the storage sub-system or a host and is coupled to TPE 407. Cascade ports 404A and host ports 404 allow plural systems 307 to be operationally coupled.

In one aspect of the present invention, the loop integrity test is implemented by transmitting a known Fibre Channel frame from one TPE port to the next TPE port. The frame traverses the transmit path inside the TPE port where a Parity Detector checks for any Parity errors and a CRC checker checks for CRC errors on the Receive path. The Frame then loops back from the Transmit path to the receive path which then goes to the next TPE port transmit path through the switch. This process takes place in all the TPE ports until the frame traverses the loop.

SES 403 receives the frame back from the Host port 404 TPE after the frame has passed through all the TPE ports. A data comparison of the frame Payload and Header determines the result of the test. Parity errors and/or CRC errors detected inside a particular TPE port can be used to isolate that port.

If Parity errors and/or CRC errors are not detected in any of the ports, then the error may be caused due to a faulty interconnection between systems 307 (See FIG. 7). In this case, the test can be repeated by removing system 307 one at a time and performing the test until the test fails.

In one aspect of the present invention, the foregoing test can also be used to detect failures caused by external faulty paths, like the path between a Fibre Channel Device and a SERDES. By including the port that is causing errors, integrity tests are also performed. A failure of the test routine will indicate an internal or external data path error.

Figure 8:
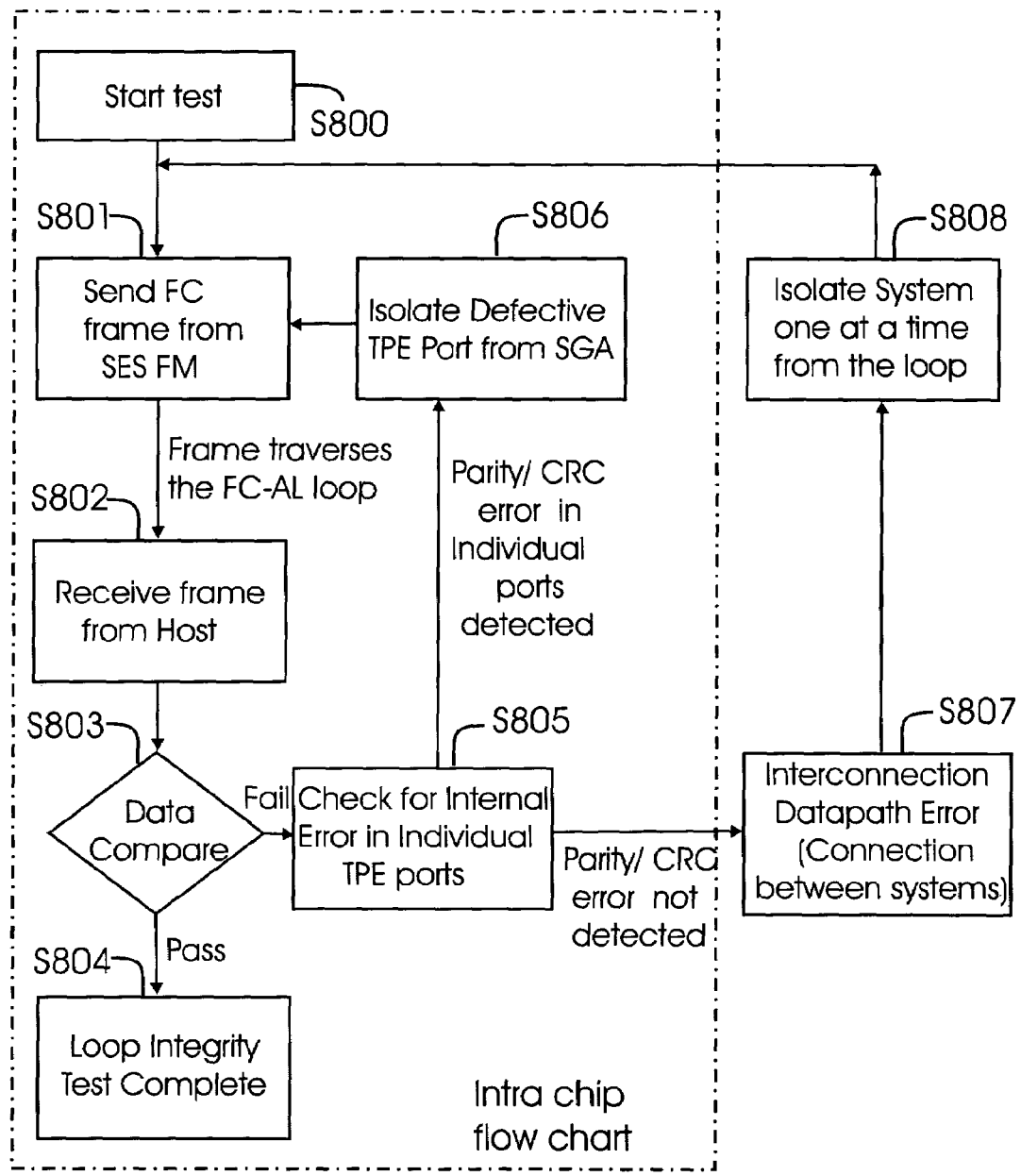
FIG. 8 shows a flow diagram of executable process steps for performing a loop integrity check using fibre channel frames, according to one aspect of the present invention.

FIG. 8 shows a flow diagram of executable process steps for performing a loop integrity check using fibre channel frames, according to one aspect of the present invention.

The process starts in step S800. In step S801, SES 403 sends a fibre channel frame to the FC-AL and the frame traverses the loop.

In step S802, SES 403 receives the traversed frame from host port 404 and data compare is performed in step S803. If the data compare passes, then the loop integrity test is deemed successful in step S804.

If the data compare fails in step S803, then in step S805 the process checks for internal errors in TPE ports. If no parity errors and/or CRC errors are detected in the TPE ports then in step S807, the process determines interconnection errors between plural systems 307. Each individual system 307 is isolated in step S808 and interconnection errors are detected. Thereafter, the process reverts back to step S801.

If parity/CRC errors are detected in step S805, then in step s806, the defective TPE port is isolated from switch matrix 408 and the process returns to step S801.

In one aspect of the present invention, an actual fibre channel frame is used to perform the integrity check, rather than a random test pattern.

Although the present invention has been described with reference to specific embodiments, these embodiments are illustrative only and not limiting. Many other applications and embodiments of the present invention will be apparent in light of this disclosure and the following claims.

What is claimed:

1. A method for performing an integrity test in a fibre channel arbitrated loop in order to determine whether any errors are present in the loop, the loop including a fibre channel switch element the method comprising:
    sending a fibre channel frame through the arbitrated loop:
    receiving the fibre channel frame after it has traversed the arbitrated loop;
    performing a data compare between the fibre channel frame that was sent and the fibre channel frame that is received;
    detecting internal errors, if any, in the switch element; and
    if an internal error is detected, isolating a port that generated the error;
    wherein the step of sending the frame through the arbitrated loop comprises sending the frame through a plurality of ports within the switch, the ports being connected in series with a receive path of one port being connected to a transmit path of a next port.

2. The method of claim 1, wherein the step of detecting internal errors is performed in a transmission protocol engine (TPE) port of the fibre channel switch element.

3. The method of claim 2, wherein a parity detector checks for pant errors on a transmit path of the TPE port.

4. The method of claim 3, wherein a Cyclic Redundancy Code (CRC) checker checks for CRC errors on a receive path of the TPE port.

5. The method of claim 1, wherein plural fibre channel switch elements are coupled to each other using a cascade port and the fibre channel frame traverses the plural fibre channel switch elements.

6. The method of claim 5, further comprising detecting interconnection data path errors between the fibre channel switch elements, if no internal errors are detected.

7. The method of claim 6, wherein the step of detecting interconnection data path errors between the fibre channel switch elements comprises successively removing each switch element from the loop and performing the integrity test until the test fails.

8. The method of claim 1, wherein a TPE port of the switch element sends the fibre channel frame to a successive TPE port of the switch element.

9. The method of claim 1, wherein a frame manager module of the switch element receives the fibre channel frame after it has traversed the arbitrated loop.

10. The method of claim 9, wherein the frame manager module comprises a Small Computer System Interface (SCSI) Enclosure Services (SES) module.

11. A fibre channel switch element coupled to an arbitrated loop, the switch element comprising:
    a cascade port configured to couple the fibre channel switch element to a second fibre channel switch element in a loop;
    a plurality of transmission protocol engine (TPE) ports within the first switch element, the TPE ports being connected in series with a receive path of one port being connected to a transmit path of a next port; and
    a frame manager module configured to send a fibre channel frame through the loop, to compare the fibre channel frame that was sent and the fibre channel frame that is received, to detect internal errors, if any, in the first switch element based on the comparison, and to isolate a TPE port that generated the internal error.

12. The fibre channel switch element of claim 11, wherein the frame manager module is configured to detect inter-connection data path errors between the fibre channel switch elements, if the comparison reveals no internal errors.

13. The fibre channel switch element of claim 12. wherein the frame manager module comprises a Small Computer System Interface (SCSI) Enclosure Services (SES) module.

14. A system for performing integrity tests in a fibre channel arbitrated loop, the system comprising:
    a plurality of fibre channel switch elements cascaded in a loop;
    a first one of the fibre channel switch elements including a plurality of transmission protocol engine (TPE) ports, the TPE ports being connected in series with a receive path of one port being connected to a transmit path of a next port; and
    the first switch element further including a host port, a cascade port, and a frame manager module for performing diagnostic services, wherein the frame manager module is configured to send a fibre channel frame through the loop, to compare the fibre channel frame that was sent and the fibre channel frame that is received, to detect internal errors, if any, in the first switch element based on the comparison, and to isolate a TPE port that generated the internal error.

15. The system of claim 14, wherein the frame manager module is further configured to detect inter-connection data path errors between the fibre channel switch elements, if the comparison reveals no internal errors.

16. The system of claim 15, wherein the frame manager module comprises a Small Computer System Interface (SCSI) Enclosure Services (SES) module.

* * * * *

UNITED STATES PATENT AND TRADEMARK OFFICE
CERTIFICATE OF CORRECTION

| | | |
|---|---|---|
| PATENT NO. | : 7,388,843 B2 | Page 1 of 1 |
| APPLICATION NO. | : 10/889551 | |
| DATED | : June 17, 2008 | |
| INVENTOR(S) | : John M Fike et al. | |

It is certified that error appears in the above-identified patent and that said Letters Patent is hereby corrected as shown below:

On the Title Page, Item (57) under "ABSTRACT", line 13, delete "a" and insert -- to --, therefor.

On the Title Page, on page 2, Item (56) under "Other Publications" line 64, delete "Mellendore et al." and insert -- Mullendore et al. --, therefor.

On the Title Page, on page 3, Item (56) under "Other Publications" line 3, after "60/286,046," insert -- Apr. 25, 2001, --, therefor.

On the Title Page, on page 3, Item (56) under "Other publications" line 9, delete "Chaper" and insert -- Chapter --, therefor.

On the Title Page, on page 4, Item (56) under "Other Publications" line 63, delete "1577,," and insert -- 1577m --, therefor.

Figure 5B:
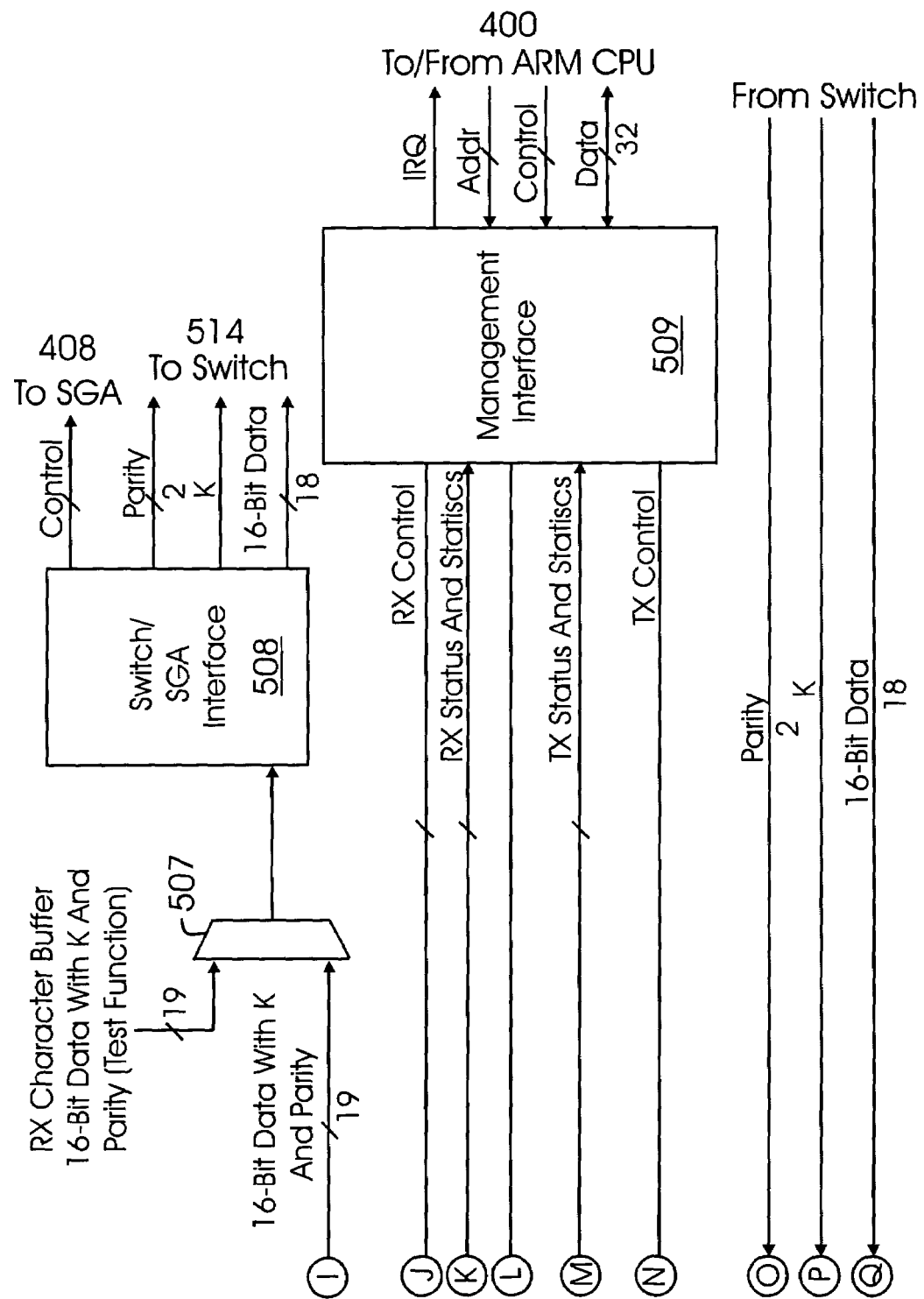

On Sheet 8 of 12, in Fig. 5B, line 11, delete "Statiscs" and insert -- Statistics --, therefor.

On Sheet 8 of 12, in Fig. 5B, line 14, delete "Statiscs" and insert -- Statistics --, therefor.

In column 1, line 64, delete "needed" and insert -- needed. --, therefor.

In column 9, line 13, in claim 1, delete "element" and insert -- element, --, therefor.

In column 9, line 14, in claim 1, delete "loop:" and insert -- loop; --, therefor.

In column 9, line 32, in claim 3, delete "pant" and insert -- parity --, therefor.

In column 10, line 23, in claim 13, delete "12." and insert -- 12, --, therefor.

Signed and Sealed this
Twenty-fifth Day of January, 2011

David J. Kappos
*Director of the United States Patent and Trademark Office*